Patented Mar. 11, 1930

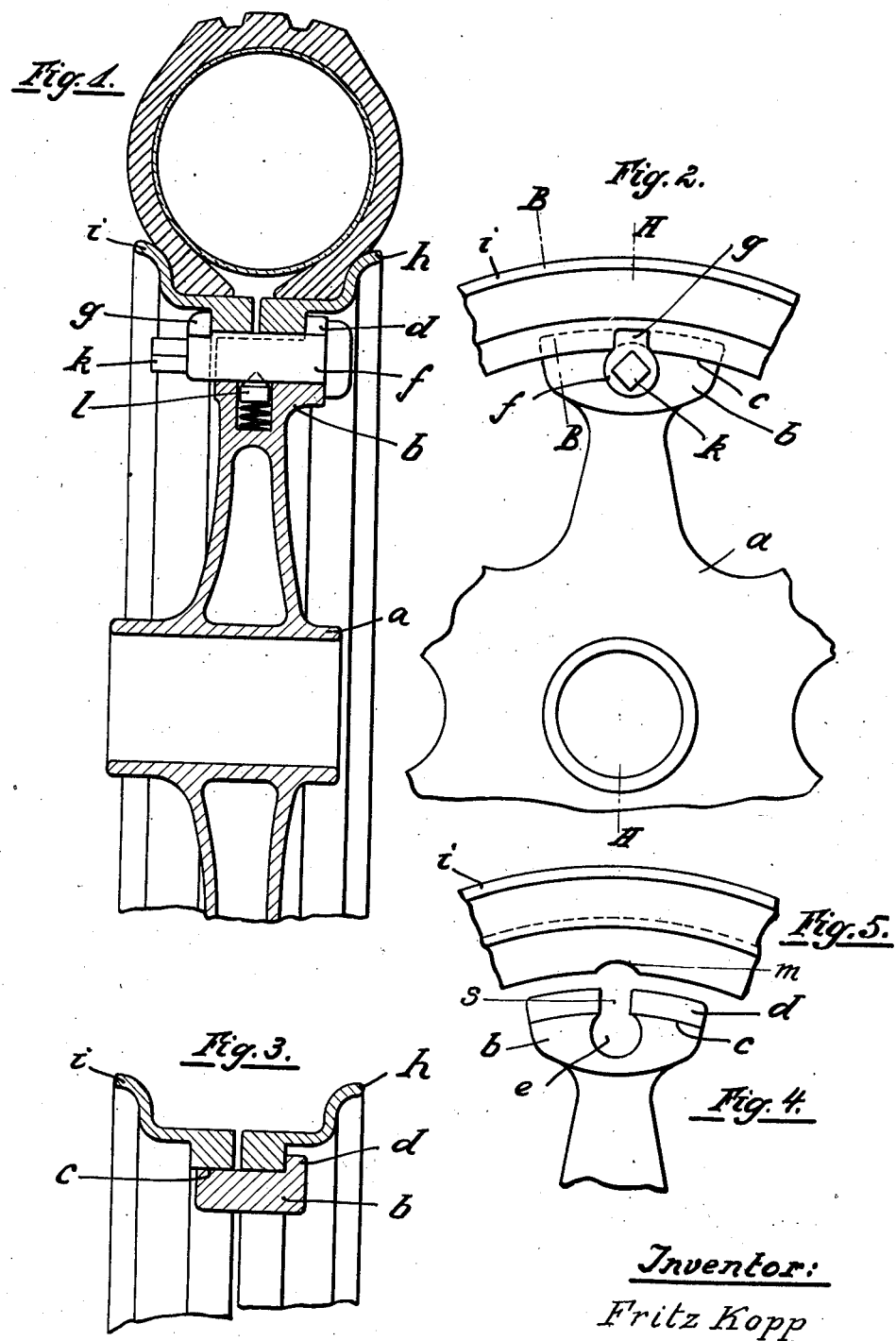

1,750,407

UNITED STATES PATENT OFFICE

FRITZ KOPP, OF ULM-ON-THE-DONAU, GERMANY

WHEEL

Application filed January 18, 1929, Serial No. 333,303, and in Germany December 7, 1925.

My invention relates to wheels and more especially to a wheel with a removable, longitudinally divided rim. It is an object of my invention to provide a wheel of this kind in which the removable rim is supported directly on the cylindrical circumferential surface of the wheel body. According to my invention the wheel body and the rim are connected by bolts extending in parallel to the axis of the wheel which bolts also connect the parts of the rim.

In the drawing in which is shown a preferred embodiment of the invention.

Fig. 1 is a section taken on the line A—A in Fig. 2,

Fig. 2 is a front view with the tire removed,

Fig. 3 is a section on the line B—B in Fig. 2,

Fig. 4 is a front view of a single spoke head, and

Fig. 5 is a front view of a small portion of the rim.

Referring to the drawing, the spoke ends of the wheel body, forming a spider, are provided with heads $b$, each comprising a cylindrical surface $c$, adapted to receive the rim, and a radially projecting flange $d$ forming an axial stop. Near the circumferential surface of the spoke heads and parallel with the axis are provided bores $e$, which are so arranged that bolts $f$ inserted into these bores partly project into the circumferential surface $c$. Each of these bolts has the usual head at one end and a lip $g$ at the other end capable of passing through the slot-shaped extension $s$ of the bore $e$ in the flange $d$, so that the bolt may be pushed into the bore in axial direction.

If the bolt is then turned so that the lip $g$ does not project beyond the bore $e$ in a radial direction, the rim parts $h$ and $i$ may be pushed on to the wheel body in an axial direction. If the bolt is then turned—by means of a square head $k$—so that its lip $g$ extends radially outward, the rim parts $h$ and $i$ are locked to the wheel body. The pressure exerted by the elastic tires on the rim entirely takes up the slack between the parts.

Various devices may be employed to avoid rotation of the bolts $f$. In the drawing a spring actuated stop $l$ is shown as engaging a notch in the bolt $f$ and permitting this bolt to be turned forcibly against the action of the stop but preventing accidental turning.

The rims $h$ and $i$ are secured against torsional movement on the wheel body by the provision of notches $m$ which engage with those portions of the bolts $f$ which project radially beyond the bores $e$.

There may be sufficient play in the bores $e$ for the bolts $f$ to enable them to be turned easily by a suitable key belonging to the tool equipment of any car.

The shapes of the parts employed, for instance, the spoke heads and rim parts, are very simple and these parts may be manufactured by turning, drilling and a small amount of cutting work. It is apparent that machines of simple construction enabling exact working may be employed, so that manufacture will be relatively cheap and precise. Another feature of the invention is the entire absence of screws which materially increases the quickness with which the device may be handled.

I wish it to be understood that I do not desire to be limited to the exact details of construction shown and described, for obvious modifications will occur to a person skilled in the art.

I claim:—

A vehicle wheel of the class described having in combination, a felly portion provided with a transverse opening having a reduced vertical portion extending to the outer edge of the felly portion and a circumferentially disposed flange, a locking bolt having a cylindrical stem arranged to be revolubly mounted in said opening and normally prevented from removal therefrom, said bolt having an enlarged head at one end arranged to abut said flange and a lug adjacent the opposite end, said lug adapted to register with the reduced portion of said opening for permitting the insertion or removal of the bolt from the wheel, a rim comprising circumferential sections mounted on said wheel, said sections having inwardly extending portions arranged to be confined between said flange and said lug, means on said sections engaging the outer surface of said bolt for preventing movement of the rim relative to the wheel, and yieldable means for preventing rotation of the bolt when the parts are in operative position.

In testimony whereof I affix my signature.

FRITZ KOPP.